(12) United States Patent
Carver et al.

(10) Patent No.: US 8,596,131 B1
(45) Date of Patent: *Dec. 3, 2013

(54) HIGH PERFORMANCE PRESSURE SENSOR

(75) Inventors: Reed Carver, King George, VA (US);
Joseph Snyder, Novelty, OH (US);
Frederick J Lisy, Euclid, OH (US);
Troy Prince, Cleveland, OH (US)

(73) Assignee: Orbital Research Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/362,447

(22) Filed: Jan. 31, 2012

Related U.S. Application Data

(63) Continuation of application No. 12/080,299, filed on Apr. 2, 2008, now Pat. No. 8,127,616, which is a continuation of application No. 11/408,694, filed on Apr. 21, 2006, now Pat. No. 7,387,028, which is a continuation of application No. 10/666,156, filed on Sep. 19, 2003, now abandoned, which is a continuation-in-part of application No. 09/726,257, filed on Nov. 30, 2000, now Pat. No. 6,622,558.

(51) Int. Cl.
*G01L 7/08* (2006.01)
(52) U.S. Cl.
USPC .............................................. 73/715; 73/700

(58) Field of Classification Search
None
See application file for complete search history.

(56) References Cited

U.S. PATENT DOCUMENTS

| | | | | |
|---|---|---|---|---|
| 4,889,590 A | * | 12/1989 | Tucker et al. | 438/53 |
| 4,905,575 A | * | 3/1990 | Knecht et al. | 92/103 SD |
| 5,683,594 A | * | 11/1997 | Hocker et al. | 438/53 |
| 6,422,084 B1 | * | 7/2002 | Fernald et al. | 73/705 |
| 6,986,285 B2 | * | 1/2006 | Avisse | 73/726 |
| 7,387,028 B1 | * | 6/2008 | Carver et al. | 73/715 |
| 7,587,944 B1 | * | 9/2009 | Shaw et al. | 73/708 |
| 7,806,001 B1 | * | 10/2010 | Shaw | 73/715 |
| 2007/0148533 A1 | * | 6/2007 | Anglin et al. | 429/56 |

* cited by examiner

*Primary Examiner* — Lisa Caputo
*Assistant Examiner* — Jermaine Jenkins
(74) *Attorney, Agent, or Firm* — Brian Kolkowski

(57) ABSTRACT

The present invention relates, in general, to pressure sensors capable of operating at high temperatures. The present invention further relates to a high temperature pressure sensor with an improved gage factor. The present invention still further provides a pressure sensor with a smaller sized diaphragm, which is capable of reading higher pressures. The present invention also provides a method and sensor for detecting strain using shape memory alloys.

20 Claims, 5 Drawing Sheets

HIGH PERFORMANCE PRESSURE SENSOR

CROSS REFERENCE TO RELATED APPLICATIONS

This application is a continuation of co-pending U.S. patent application Ser. No. 12/080,299 filed Apr. 2, 2008 now U.S. Pat. No. 8,127,616, which in turn is a continuation of Ser. No. 11/408,694 filed Apr. 21, 2006 now U.S. Pat. No. 7,387,028, which in turn is a continuation of U.S. patent application Ser. No. 10/666,156 filed Sep. 19, 2003 that is now abandoned, which in turn is a continuation-in-part of U.S. patent application Ser. No. 09/726,257 filed Nov. 30, 2000 now U.S. Pat. No. 6,622,558.

This invention was made with United States Government support under Contract DAAE07-00-C-L009 awarded by the U.S. Army Tank-Automotive and Armaments Command, the United States Government has rights in this invention pursuant thereto.

BACKGROUND OF THE INVENTION

1. Field of the Invention

The present invention relates, in general, to pressure sensors capable of operating at high or elevated temperatures and more particularly to shape memory alloys (SMA's) that can be used at high or elevated temperatures as a pressure sensor.

2. Technical Background

In recent years there has been a need for high or elevated temperature pressure sensors for various applications including for use in harsh environments. In these harsh environments such as for use in engine cylinders and turbine engines, the pressure sensors are exposed to a corrosive, oxidizing environments which put high mechanical and thermal stresses on the sensors. Various approaches have been taken in order to protect the pressure sensors from these environmental conditions and to allow the sensor to remain operational over extended periods of time. These approaches include sealing the pressure sensor to shield it from the environment such as follows:

U.S. Pat. Nos. 6,363,792 and 6,530,282 to Kurtz et al. disclose a hermetically sealed high temperature pressure transducer assembly (sensor) formed on silicon including: a sensor wafer that includes a plurality of sensor structures and contact areas selectively interconnected and formed on a surface. The surface being hermetically sealed and isolated from the harsh environment from which the pressure is being measured.

U.S. Pat. No. 6,523,415 to Kurtz et al. discloses a pressure transducer formed on silicon including: a first surface adapted for receiving a pressure applied thereto, an oppositely disposed second surface, and a flexing portion adapted to deflect when pressure is applied to the first surface; at least a first sensor formed on the second surface and adjacent to a center of the flexing portion, and adapted to measure the pressure applied to the first surface, at least a second gage sensor formed on the second surface and adjacent to a periphery of the flexing portion, and adapted to measure the pressure applied to the first surface; a glass substrate secured to the second surface of the silicon wafer.

While sealing the sensor from the environment has helped create a more durable sensor, at high temperatures these sensing devices also suffer from the drawback of having too low of a gage factor resulting in larger sensors or sensors with signals that are difficult to measure. Gage factor is a measure of the sensitivity of the sensor. With too low of a gage factor, the sensitivity of the sensing element is reduced creating difficulty in reading the sensing element, or the diaphragm size has to be increased to make up for the reduced sensitivity. These devices are typically made by diffusing the sensing elements into a silicon diaphragm. With these types of devices the gage factor significantly decreases with increasing temperature.

This drawback has been avoided in part by the use of other materials. U.S. Pat. No. 6,327,911 to Kurtz discloses a high temperature pressure transducer comprising a diaphragm fabricated from beta-silicon carbide and at least one sensing element fabricated from beta-silicon carbide associated with the diaphragm. Kurtz claims that this type of transducer exhibits gage factors of above 30 at room temperature and between 10-15 at 550° C. While the development by Kurtz improves the potential sensitivity, it would be desirable to have a sensor with even better sensitivity and that does not change significantly with temperature increases so that not only can the sensing element be read more easily, but also so smaller sensors can be formed.

In looking at other forms of materials, there is a material known as a shape memory alloy (SMA). Shape memory alloys (SMA's) are a class of materials that have the ability to form two different crystalline phases, usually referred to as the martensite and austenite phases, in response to temperature and strain. SMA's are produced by combining at least two component elements into a desired shape which is then annealed. Immediately upon being annealed, the SMA material is in the austenite phase, having a specific shape (referred to hereinafter as the parent shape), and characterized by a low ductility, high Young's Modulus and high yield stress. Upon cooling, the SMA material changes into the martensite phase characterized by a high ductility, low Young's Modulus and low yield stress. In the martensite phase, the SMA material is easily deformed and can take on a different shape from its austenite, or parent, shape by the application of an external strain thereto. The SMA material will retain this different shape until it is heated to its austenite phase transformation temperature. When such heating occurs, the SMA material undergoes a phase transformation to its austenite phase and is transformed back to its parent shape. During this phase transformation the SMA material produces a very high kinetic energy output per unit volume. Because of this, SMA's can generate a relatively large force over a longer displacement as compared to other materials of the same size. Additionally, because of the electrical resistance characteristics of SMA material, joule heating can be used to raise the SMA material to its austenitic phase transformation temperature. Furthermore, the electrical resistance characteristics of SMA material results in a strain-dependent electrical resistance effect at the phase transformation temperature.

The two significant physical properties of SMA material, i.e., high recoverable strain and high actuation energy densities, have led to the development of SMA materials and devices for various applications. Bulk or thick film SMA materials are produced using traditional metal forming processes and are incorporated into many different devices ranging from orthodontia appliances to visored helmets. In these applications the bulk or thick film SMA materials take the form of wires, springs, thread fasteners, ring clamps, etc. Thin film SMA materials are produced by depositing an alloy on a substrate and have gained acceptance in micro fluidics and temperature related applications, particularly as actuators. Typically, applications utilizing bulk or thick film SMA materials exploit the one-way shape-memory property of SMA material. In these applications the bulk or thick film SMA material is strained (deformed) in the low temperature martensite phase and recovers to its parent shape upon being heated to the temperature at which the SMA material is transformed to its high temperature austenite phase. The strain-dependent electrical resistance effect of SMA material, however, has not been utilized for strain measuring devices or sensors because of is the thermodynamic inefficiency of bulk or thick film SMA material. The hysteresis characteristics of bulk or thick film SMA material, which determine the phase transformation cycle period, are too slow (on the order of seconds) to be effective as a sensor. The slowness of the hysteresis characteristics of bulk or thick film SMA material is caused by the high thermal mass of this material. In contrast, due to the low thermal mass of thin film SMA material, the hysteresis characteristics of this material are quite fast (on the order of cycles/second) which makes thin film SMA material particularly suitable for certain applications, such as sensors, where the change in electrical resistance at a phase transformation of this material can be correlated to a change in strain being applied to the material. A problem, however, arises with thin film SMA material due to the difficulty in producing reliable thin film SMA materials that can repeatedly and consistently provide accurate strain measurements. Recent advances in manufacturing techniques, however, have resulted in the production of thin film SMA materials that exhibit a consistent quality suitable for use in strain measuring devices. Because of these manufacturing advances, it has become desirable to develop a sensor and method for measuring strain utilizing thin film SMA materials.

It is therefore the object of the present invention to provide a high temperature pressure sensor without the drawbacks of the prior art. It is further the object of the present invention to provide a high temperature pressure sensor with an improved gage factor. It is still further the object of the present invention to provide a pressure sensor with a smaller sized diaphragm, which is also capable of reading higher pressures. Finally, it is even still further the object of the present invention to provide a high temperature sensor made from a SMA material.

SUMMARY OF THE INVENTION

The present invention relates, in general, to pressure sensors capable of operating at high temperatures. The present invention further relates to a high temperature pressure sensor with an improved gage factor. The present invention still further provides a pressure sensor with a smaller sized diaphragm, which is capable of reading higher pressures. The present invention also provides a method and sensor for detecting strain using shape memory alloys.

In a number of embodiments, the sensor of the present invention comprises a substrate material, a flexible diaphragm provided on the substrate material and a sensor member deposited on the flexible diaphragm. The sensor member may be formed from a thin film SMA material and is capable of undergoing a phase transformation, such as from its martensite phase to its austenite phase, in response to a physical stimulus, such as strain, being applied thereto. During such a phase transformation, the electrical resistance of the thin film SMA material undergoes a substantial change. This change in electrical resistance can be correlated to a change in strain being applied to the thin film material. In this manner pressure can be measured. The present invention also provides a method for measuring a physical stimulus comprising the steps of providing a sensor comprising a thin film SMA material; measuring a physical property, such as the electrical resistance, of the thin film SMA material immediately before the material undergoes a phase transformation caused by the application of a physical stimulus thereto; applying a physical stimulus to the thin film SMA material causing the material to undergo a phase transformation; measuring a physical property, such as the electrical resistance, of the thin film SMA material immediately after the material undergoes a phase transformation; determining the difference in the value of the physical property, i.e., the electrical resistance, that occurs during the phase transformation; and utilizing the difference in the value of the physical property to determine the magnitude of the physical stimulus being applied to the thin film SMA material.

One embodiment of the present invention includes a pressure sensor comprising a substrate with an opening; and a flexible diaphragm held across the opening of the substrate wherein at temperatures of at least 37° C., the pressure sensor has a gage factor of at least about 35.

In another embodiment, the present invention includes a pressure sensor comprising a substrate with an opening; and a flexible diaphragm held across the opening of the substrate wherein at temperatures of at least 200° C., the pressure sensor has a gage factor of at least about 27.

In still another embodiment, the present invention includes a pressure sensor comprising a substrate with an opening; and a flexible diaphragm held across the opening of the substrate wherein at temperatures of at least 400° C., the pressure sensor has a gage factor of at least about 22

In yet another embodiment, the present invention includes a pressure sensor comprising a substrate with an opening; and a flexible diaphragm held across the opening of the substrate wherein at temperatures of at least 500° C., the pressure sensor has a gage factor of at least about 20.

In yet another embodiment, the present invention includes a pressure sensor comprising a substrate with an opening; and a flexible diaphragm held across the opening of the substrate wherein at temperatures of at least 550° C., the pressure sensor has a gage factor of at least about 16.

In yet another embodiment, the present invention includes a pressure sensor comprising a sensing element; and a heating element capable of heating the sensing element to at least about the application temperature of the pressure sensor.

In yet another embodiment, the present invention includes a pressure sensor comprising a substrate with an opening having a maximum cross-sectional dimension of less than about 1.0 mm; and a flexible diaphragm.

Finally, in yet another embodiment, the present invention includes a method of determining pressures in an engine comprising the steps of providing a sensing element for a chamber having a given operating temperature for the engine in which a pressure is to be measured; heating the sensing element to at least about the operating temperature of the chamber; and measuring the pressure of the chamber through the sensing element.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodi-

DESCRIPTION OF THE PREFERRED EMBODIMENT

Figure 1:
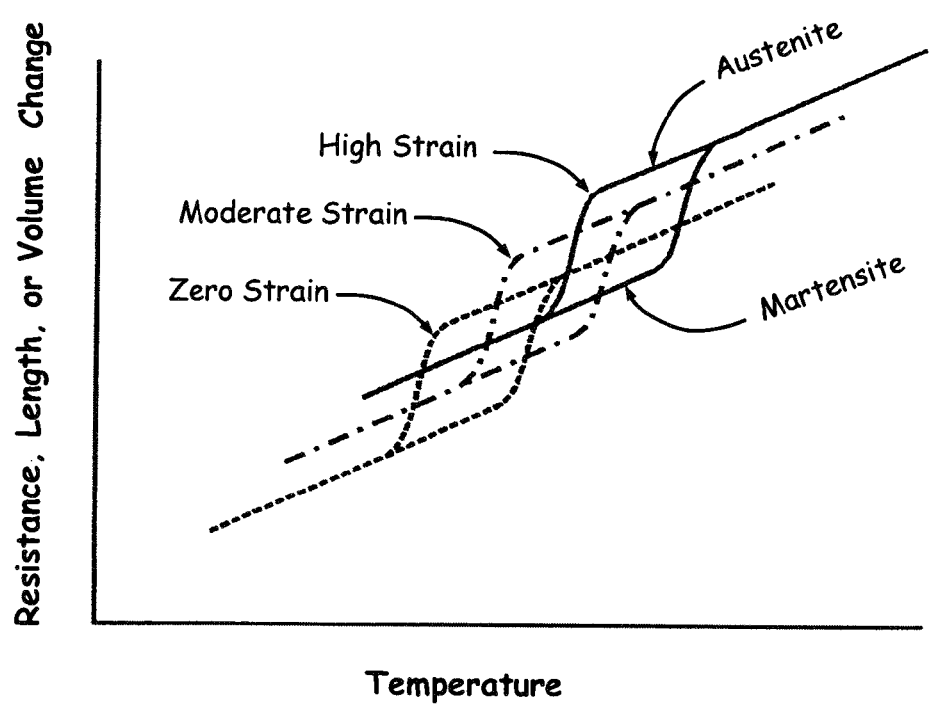
FIG. 1 is a hysteresis curve of Electrical Resistance or Length Change or Volume Change vs. Temperature for a hypothetical SMA material.

The present invention relates, in general, to pressure sensors capable of operating at high temperatures. The present invention further relates to a high temperature pressure sensor with an improved gage factor. The present invention still further provides a pressure sensor with a smaller sized diaphragm, which is capable of reading higher pressures. The present invention also provides a method and sensor for detecting strain using shape memory alloys.

In a number of embodiments, the present invention relates to a method and sensor to detect strain utilizing the strain-dependent electrical resistance effect of SMA materials at their phase transformation temperature. The strain can be produced by any external stimulus, such as mechanical vibration, pressure, force, stress or other strain inducing external input.

A number of embodiments of the present invention include a pressure sensor comprised of a substrate with an opening, and a flexible diaphragm held across the opening of the substrate. The substrate can be made from any material known to those skilled in the art. The opening of the substrate is important. If the opening is large it correspondingly requires a larger pressure sensing device, and in the case of measurement of larger pressures a diaphragm with increased mechanical properties. If the opening is small, the sensitivity of the device suffers. Therefore with smaller devices, and therefore smaller openings it is desirable to have pressure sensors with the highest possible gage factors (which is explained below). Preferably, the maximum cross-sectional dimension of the opening across which the flexible diaphragm lies is less than about 1.0 mm, more preferably less than about 0.5 mm, and most preferably less than about 0.25 mm. The diaphragm, likewise, can also be made from any material know to those skilled in the art, provided it has a flexibility corresponding to the pressure and the pressure range for which it is desired to be measured. Preferably, the diaphragm is made from a material across which the sensor can be applied or deposited and a good bond can be formed. More preferably, the diaphragm is made from silicon. Preferably, the flexible diaphragm has a thickness less than about 350 um extending across the opening of the substrate, more preferably less than about 250 um, and most preferably less than about 150 um.

The pressure sensor of the present invention preferably is capable of measuring a wide range of pressures, and for measuring fairly high pressures without premature failure. This is because while these pressure sensors can be used for any application known to those skilled in the art, many of those applications are in areas requiring the measurement of fairly high pressures. Two areas of prime application of these pressure sensors are for the measurement of pressures in turbine engines as well as the measurement of pressures in internal combustion engines. Because of this, preferably, the pressure sensor is capable of measuring pressures above 1000 psi; more preferably, above about 2000 psi; even more preferably above about 3000 psi; and most preferably above about 5000 psi without premature failure. Also preferably, the pressure sensor is capable of measuring pressures less than about 300 psi; more preferably, less than about 200 psi; even more preferably less than about 100 psi; and most preferably less than about 75 psi.

Referring now to FIG. 1, hysteresis curves of Electrical Resistance or Length Change or Volume Change vs. Temperature for a hypothetical SMA material is shown for three different levels of strain, i.e., zero strain, moderate strain, and high strain. In each instance, the bottom portion of each curve represents the material when in the martensite phase and the top portion of each curve represents the material when in the austenite phase. The portions of each curve interconnecting the bottom portion of the curve with the top portion of the curve represents a phase transformation, i.e., either from the martensite phase to the austenite phase or from the austenite phase to the martensite phase. As can be seen, each curve has a similar shape and as strain increases, the curves shift in a positive direction along the X and Y axes. Upon heating, the SMA material spontaneously transforms from the martensite phase to the austenite phase at the phase transformation temperature (the velocity of transformation is the acoustic velocity). The phase transformation temperature is a relatively narrow band of temperatures. Many of the physical properties of a SMA material, including electrical resistance, ductility, Young's Modulus, reflectivity, etc., undergo a substantial change in value during a phase transformation. The present invention relates to the large change in electrical resistance that occurs in SMA material during a phase transformation.

It has been found that when an SMA material is held at or near its phase transformation temperature, an application of strain to the material causes the material to undergo the phase transformation with a corresponding large change in the electrical resistance of the material. The amount of strain required to induce the transformation may be quite small, on the order of 0.1% or less. The figure of merit for strain gages is called the gage factor and is defined as the normalized change in electrical resistance divided by the change in strain (Gage Factor—G.F.—$((\Delta R/R)/c)$, where R is the electrical resistance; $\Delta R$ is the change in the electrical resistance; and c is the strain. The gage factor for typical metal film strain gages is on the order of 2 to 5. Silicon and polycrystalline silicon piezoresistors have gage factors that vary from less than 1 to over 100 depending upon their orientation, doping level and crystalline perfection. However, this level of gage factor is quite difficult to achieve in practice. Furthermore, the high gage factor of silicon materials is lost when operated at elevated temperatures. The change in the electrical resistance of SMA material at its phase transformation temperature can, however, be on the order of 20% for a strain of 0.1%, thereby achieving a gage factor of nearly 200 ($\Delta R/R$—0.2 and $\epsilon$—0.001; therefore, 0.2/0.001—200). Also, SMA materials can have phase transformation temperatures in excess of 550° C. and, therefore, can be utilized in highly sensitive strain sensors at elevated temperature. The present invention discloses a method and a sensor utilizing SMA material to utilize this effect.

Preferably, the pressure sensor of the present invention has a gage factor of at least about 35 at temperatures of at least about 37° C., more preferably a gage factor of at least about 40 at temperatures of at least about 37° C., and most preferably a gage factor of at least about 42 at temperatures of at least about 37° C. Preferably, the pressure sensor of the present invention has a gage factor of at least about 27 at temperatures of at least about 200° C., more preferably a gage factor of at least about 32 at temperatures of at least about 200° C., and most preferably a gage factor of at least about 37 at temperatures of at least about 200° C. Preferably, the pressure sensor of the present invention has a gage factor of at least about 22 at temperatures of at least about 400° C., more preferably a gage factor of at least about 30 at temperatures of at least about 400° C., and most preferably a gage factor of at least about 35 at temperatures of at least about 400° C. Preferably, the pressure sensor of the present invention has a gage factor of at least about 20 at temperatures of at least about 500° C., more preferably a gage factor of at least about 30 at temperatures of at least about 500° C., and most preferably a gage factor of at least about 35 at temperatures of at least about 500° C. Preferably, the pressure sensor of the present invention has a gage factor of at least about 16 at temperatures of at least about 550° C., more preferably a gage factor of at least about 25 at temperatures of at least about 550° C., even more preferably a gage factor of at least about 30 at temperatures of at least about 550° C. and most preferably a gage factor of at least about 35 at temperatures of at least about 550° C.

In another embodiment of the present invention, preferably the pressure sensor has a heating element capable of heating the sensing element, whether it be a strain gage or some other type of element, to at least about the application temperature (and in the case of SMA materials to the transformation temperature). This allows for stabilization of the sensing element in applications such as engine applications where the temperature varies. This also provides a method of determining pressures in an engine comprising the steps of providing a sensing element for a chamber having a given operating temperature for the chamber in which a pressure is to be measured, heating the sensing element to at least about the operating temperature of the chamber and measuring the pressure of the chamber through the sensing element. Preferably, the heating element heats the sensing element to a temperature at or above the highest application temperature of the sensing element. One embodiment of the heating element is more specifically described later in the application in reference to FIG. 7.

The SMA material of certain specific embodiments of the present invention can be, but is not limited to, binary and equal parts (atomic weight percent) of elements, binary and unequal parts of elements, or ternary or quaternary parts of various compositions of elements. These compositions may comprise elements such as a mixture of titanium and nickel (TiNi) or titanium, nickel and palladium (TiNiPd) although it can be appreciated by one having ordinary skill in the art that the present invention is not limited to SMA material comprised of the aforementioned elements. Variations in composition and alloying content affect the temperature at which a phase transformation occurs. For example, in a SMA material comprising TiNi having approximately 50% atomic weight of each element, a 1 to 2% change in the percentage of titanium to nickel shifts the phase transformation temperature from below 0 to over 90 C. Thus, the phase transformation temperature can be stoichiometrically tailored by utilizing binary alloys and can be extended by using ternary alloys. A SMA material comprising TiNiPd can have a phase transformation temperature as high as 550 to 600 C depending upon the relative concentration of Pd to Ni. As Pd is substituted for Ni, the phase transformation temperature increases until the resulting compound is completely TiPd whereupon the phase transformation temperature is at its maximum.

Figure 2:
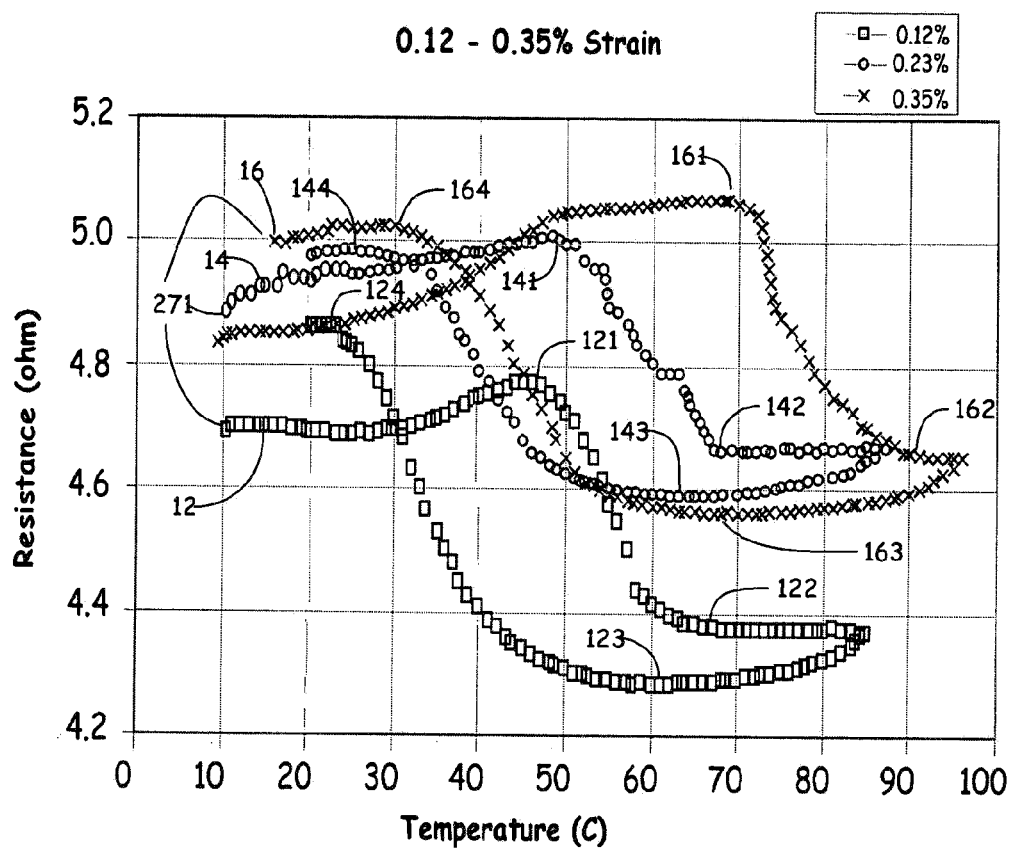
FIG. 2 is a graph of Electrical Resistance vs. Temperature and shows the hysteresis curve of a thin film SMA material under three different strain levels.

Referring now to FIG. 2, there is shown a graph of Electrical Resistance vs. Temperature illustrating the hysteresis curves of SMA material under strain levels of 0.12% 12, 0.23% 14 and 0.35% 16. Each hysteresis curve has an austenite start point 121, 141 and 161; an austenite finish point, 122, 142 and 162; a martensite start point 123, 143 and 163; and a martensite finish point 124, 144 and 164, defining individual hysteresis curves. As the temperature of the SMA material increases, it reaches the austenite start point 121, 141, 161 and the austenite phase transformation begins. The electrical resistance of the material decreases until it reaches its austenite finish point 122, 142, 162. As the temperature of the SMA material is then decreased, the material reaches its martensite start point 123, 143 and 163 and the martensite phase transformation begins. The electrical resistance of the material increases until the material reaches its martensite finish point 124, 134 and 164. As is evident from the graph, the hysteresis curves shift in response to changing strain, generally moving in a positive direction with respect to both the X and Y axes in response to increasing strain. This "shifting" characteristic causes the electrical resistance of the SMA material to change with respect to both temperature and strain.

In one application of the present invention, the SMA material is heated to its austenite start point and then maintained at that temperature. As the strain increases, the electrical resistance of the SMA material at the austenite start point is measured. In FIG. 2, at approximately 450° C., this electrical resistance is 4.78 ohms for 0.12 strain 121, 5.04 ohms for 0.23% strain, and 5.12 ohms for 0.35% strain. In another application of the present invention, the SMA material is heated past its austenite phase transformation point, and then cooled to its martensite start point and maintained at that temperature. As the strain increases, the electrical resistance of the SMA material at the martensite start point is measured, In FIG. 2, at approximately 600° C., this electrical resistance is 4.28 ohms for 0.12% strain 123, 4.43 ohms for 0.23% strain and 4.46 ohms for 0.35% strain, In still another application of the present invention, the SMA material is heated and subsequently cooled through its entire hysteresis curve while maintaining strain substantially constant. The characteristics of the resulting curve are compared to other hysteresis curves in a "look-up" table to determine the value of the average strain being applied to the SMA material.

Figure 3:
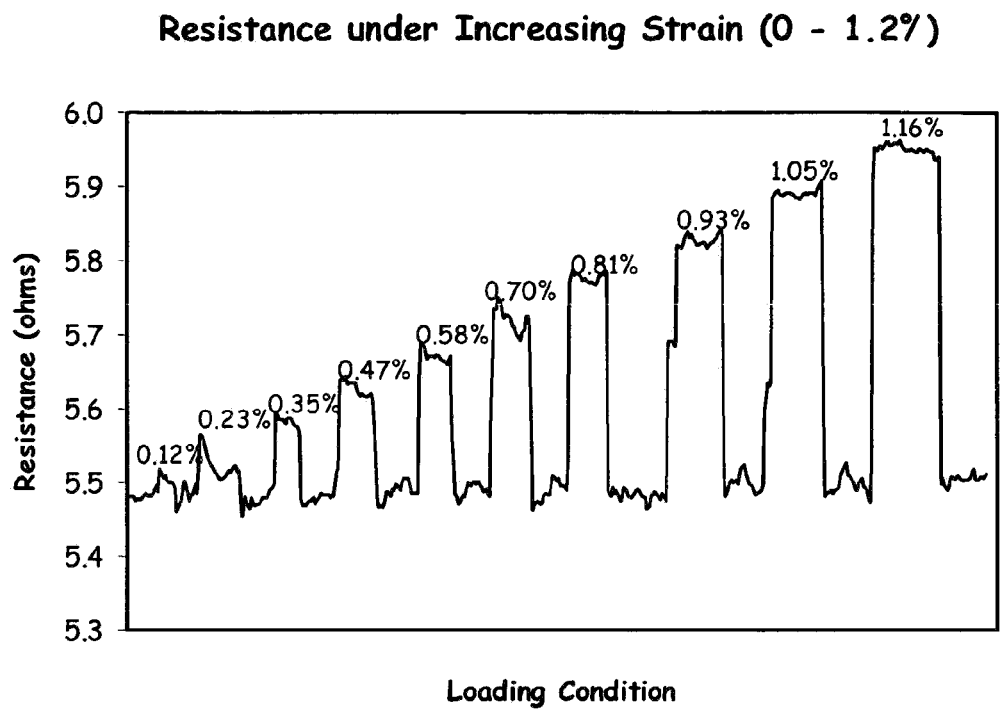
FIG. 3 is a graph of Electrical Resistance vs. Loading Condition for a thin film SMA s material subjected to an increasing strain level from 0-1.2%.

Referring now to FIG. 3, there is shown a graph of Electrical Resistance vs. Loading Condition for a thin film or wire SMA material subjected to an increasing strain level from 0-1.2%. As can be seen from this graph, the electrical resistance of the thin film SMA material increases in a substantially linear manner, from 5.49 ohms to 5.95 ohms, with an increase in the level of strain from 0.12% to 1.16%. Also, it can be seen that the electrical resistance of the material returns to nearly the same value (approximately 5.49 ohms) when the strain is removed. The loading condition corresponds to pressure or force applied to the thin film SMA material which produces the strain thereon.

Figure 4:
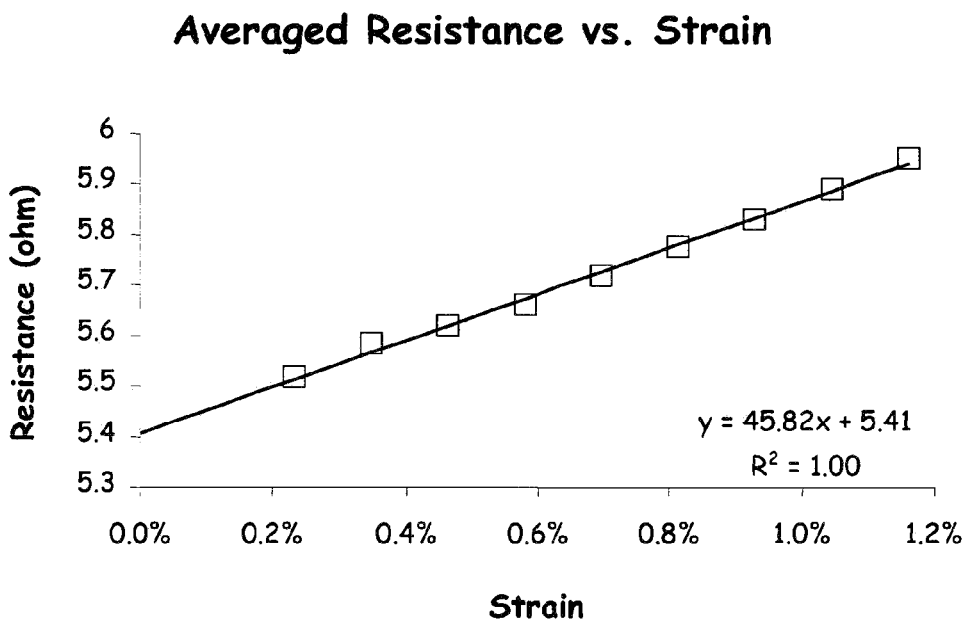
FIG. 4 is a Best Fit Line Graph of Electrical Resistance vs. Strain showing the linear response therebetween for a thin film SMA material.

FIG. 4 is a Best Fit Line Graph of Electrical Resistance vs. Strain. This graph illustrates the substantially linear response of the thin film or wire SMA material to the application of strain applied thereto. The Best Fit Line has an $R^2$ value of 1.00 and is defined by the equation y=45.82x±5.41.

Figure 5:
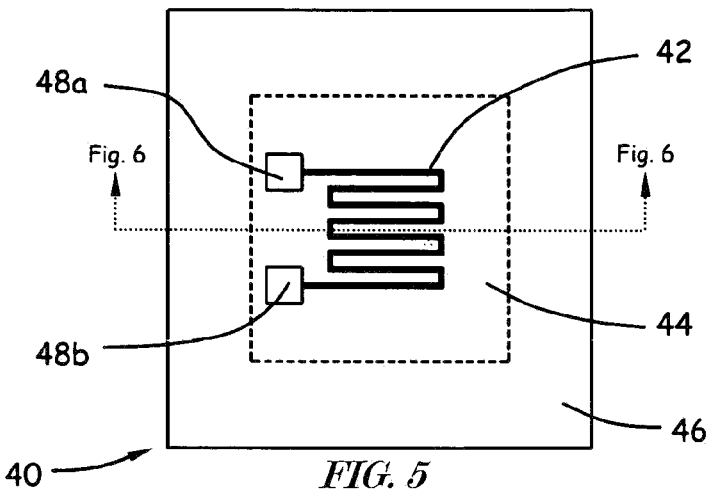
FIG. 5 is a plan view of a thin film SMA material strain sensor.
Figure 6:
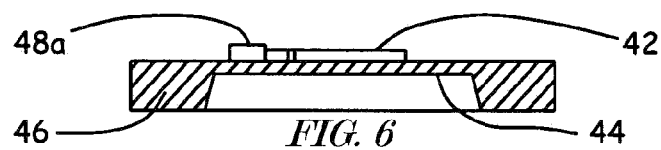
FIG. 6 is a cross-sectional view of a thin film SMA material strain sensor taken across section-indicating lines 6-6 of FIG. 5.
Figure 8:
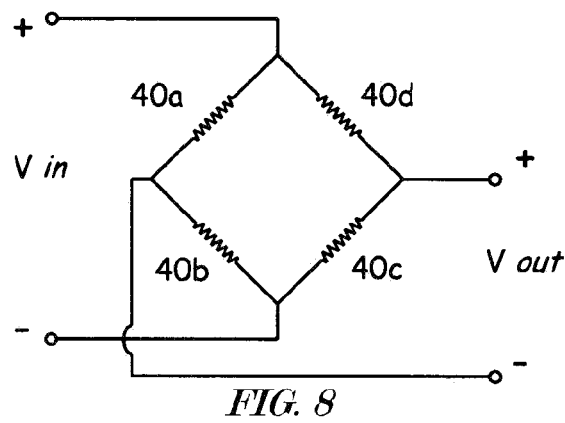
FIG. 8 is an electrical schematic of four thin film SMA material strain sensors in a Wheatstone Bridge configuration.

Referring now to FIG. 5, there is shown a plan view of a SMA material strain sensor 40. A sensor element 42 formed from thin film TiNi material is deposited over a flexible diaphragm 44 on a substrate 46. Typically, the flexible diaphragm 44 has an area of approximately 1 mm$^2$ whereas the substrate 46 has an area of approximately 1 cm$^2$. Sensor terminals 48a and 48b provide electrical connection points for leads (not shown) for attachment of the sensor element 42 to external measuring devices or controllers. When a strain is applied to the flexible diaphragm 44, the sensor element 42 flexes, Since the sensor element 42 is at the martensite/austenite phase transformation temperature, the sensor element 42 readily flexes and exhibits substantially linear electrical resistance vs. strain characteristics, The electrical resistance of the sensor element 42 increases as the strain applied thereto increases. The electrical resistance of the sensor element 42 can be transmitted through the sensor terminals 48a and 48b to external measuring devices or controllers. For example, a change in the electrical resistance of the sensor element 42 can be transformed into a change in the voltage drop across same. In view of the foregoing, the SMA strain sensor 40 can be utilized in a control circuit where a change in pressure or force is being monitored. An example of such a circuit is illustrated in FIG. 8 which is an electrical schematic of four SMA strain sensors 40a, 40b, 40c, and 40d connected in a basic Wheatstone Bridge circuit. Because of their electrical resistive characteristics, the SMA strain sensors 40a, 40b, 40c and 40d can be utilized in any Wheatstone Bridge circuit application in which the change in output voltage corresponds to change in strain.

Figure 7:
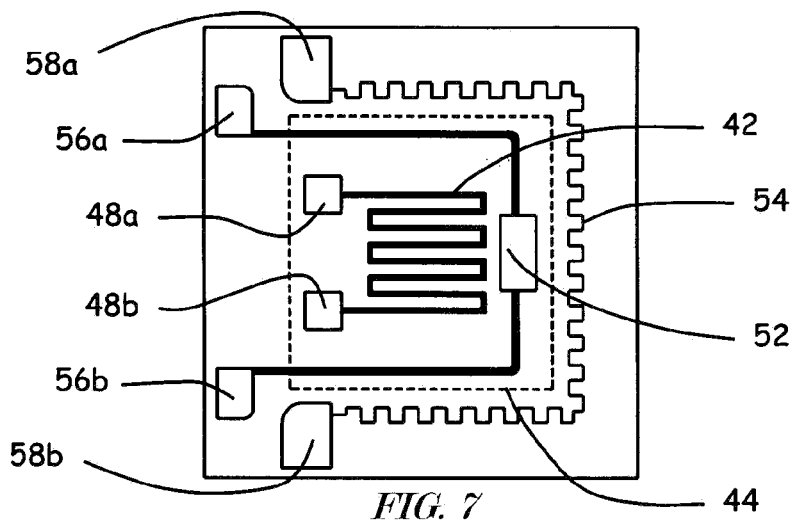
FIG. 7 is a plan view of a thin film SMA material strain sensor including a temperature measuring element and a heating element.

Referring now to FIG. 7, there is shown a plan view of the SMA material strain sensor 40 illustrated in FIG. 4 but further including a temperature measuring element 52 and a heating element 54. The temperature measuring element 52 and heating element 54 are used to ensure that the temperature of the sensor element 42 is maintained at the phase transformation temperature. The temperature measuring element 52 can be any suitable temperature measuring device whereas the heating element 54 can be a resistance heater integrated into the sensor element 42, or can be separate therefrom. The temperature measuring element 52 is located on or near the flexible diaphragm 44 to provide an accurate measurement of the temperature of the sensor element 42. Typically, the flexible diaphragm 44 is a thin diaphragm resulting in low power consumption and fast thermal response. Temperature terminals 56a and 56b provide a connection between the temperature measuring element 52 and external temperature measuring devices. The heating element 54 is located on the diaphragm 44 to provide a substantially uniform temperature to the sensor element 42. The heating element 54 is also capable of varying the temperature of the sensor element 42 through the phase transformation process. Heater terminals 58a and 58b provide connection between the heater element 54 and an external power source when the environment is cooler than the phase transformation temperature. In this manner, the sensor 40 can be operated above ambient temperature and the sensor operation can be tailored for optimum sensitivity.

Figure 9:
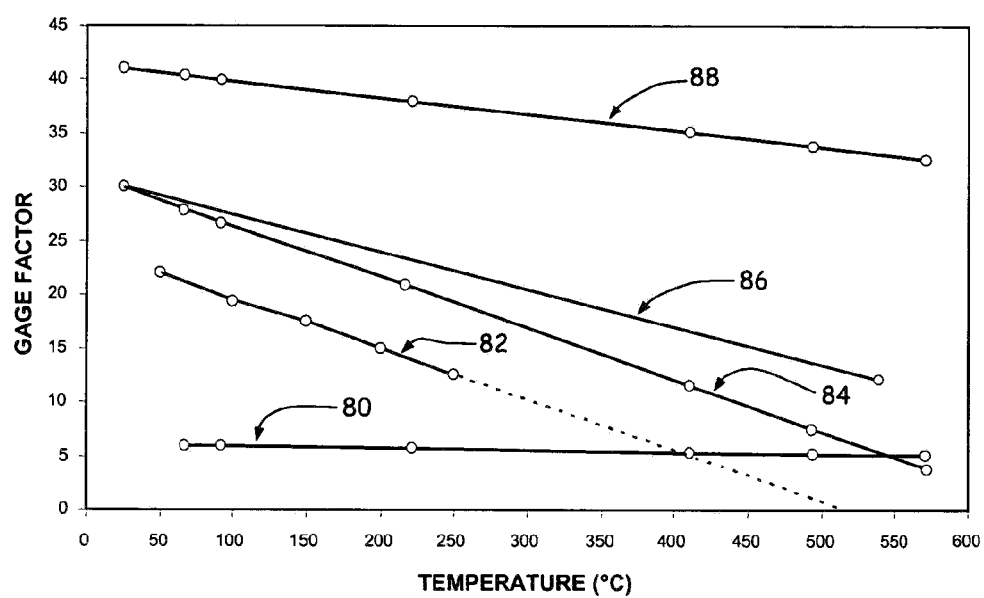
FIG. 9 is a graph comparing the gage factors of other prior art pressure sensors with the pressure sensor of the present invention over a wide temperature range.

Referring now to FIG. 9, there is a graph comparing the gage factors other prior art pressure sensors with the pressure sensor of the present invention over a wide temperature range. The line 80 in the graph represents the gage factors of metal film strain gage pressure sensors. As can be seen in the graph, metal film pressure sensors have a low gage factor across the entire temperature range of from approximately 50-550° C. The lines 82 and 84 represent n-type and p-type piezoresistive pressure sensors. As can be seen in the graph, these types of pressure sensors can have higher gage factors at the lower temperatures, but the gage factor quickly degrades with increasing temperature becoming lower than that of a metal film pressure sensor at temperatures above 550° C. The line 86 represents a B-silicon carbide pressure sensor. While this pressure sensor exhibits an improved gage factor at elevated temperatures, the gage factor is still very limiting from the aspect of designing the overall sensor. Finally, line 88 represents the pressure sensor of the present invention. This pressure sensor exhibits an excellent gage factor across the entire temperature range and allows for the design of smaller more sensitive pressure sensors.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What we claim is:

1. A pressure sensor comprising
   a substrate with an opening having a maximum cross-sectional dimension of less than about 1.0 mm;
   a flexible diaphragm; and
   a strain sensing element
   wherein the pressure sensor is capable of measuring pressures of greater than 3000 psi without premature failure.

2. The pressure sensor in claim 1, wherein the pressure sensor is capable of measuring pressures less than about 300 psi.

3. The pressure sensor in claim 1, wherein the pressure sensor is used in an diesel engine.

4. The pressure sensor in claim 1, wherein the pressure sensor is used in a turbine engine.

5. A pressure sensor comprising
   a substrate with an opening having a maximum cross-sectional dimension of less than about 1.0 mm;
   a flexible diaphragm;
   a strain sensing element; and
   a cooling element for stabilization of the sensing element for high temperature engine applications;
   wherein the pressure sensor is capable of measuring pressures of greater than 1000 psi without premature failure.

6. The pressure sensor in claim 5, wherein the opening in the substrate has a maximum cross-sectional dimension of less than about 0.25 mm.

7. The pressure sensor in claim 5, wherein the flexible diaphragm has a thickness of less than 350 um extending across the opening of the substrate.

8. The pressure sensor in claim 5, wherein the pressure sensor is capable of measuring pressures of greater than 3000 psi without premature failure.

9. The pressure sensor in claim 5, wherein the sensing element is made from a shape memory alloy material.

10. The pressure sensor in claim 5, wherein the pressure sensor is used in a turbine engine.

11. The pressure sensor in claim 5, wherein the pressure sensor is used in an internal combustion engine.

12. The pressure sensor in claim 5, wherein the pressure sensor is used in a diesel engine.

13. A pressure sensor comprising
   a substrate with an opening;
   a flexible diaphragm across the opening; and
   a sensing element
     wherein the pressure sensor is capable of measuring pressures of less than about 200 psi and greater than about 1000 psi without premature failure.

14. The pressure sensor in claim 13, wherein the pressure sensor is capable of measuring pressures of greater than about 3000 psi without premature failure.

15. The pressure sensor in claim 14, wherein the pressure sensor is capable of measuring pressures of less than about 100 psi.

16. The pressure sensor in claim 13, the pressure sensor is capable of measuring pressures of greater than about 5000 psi without premature failure.

17. The pressure sensor in claim 16, wherein the pressure sensor is capable of measuring pressures of less than about 100 psi.

18. The pressure sensor in claim 13, wherein the pressure sensor is capable of measuring pressures of less than about 100 psi.

19. The pressure sensor in claim 13, wherein the pressure sensor is used in a turbine engine.

20. The pressure sensor in claim 13, wherein the pressure sensor is used in a diesel engine.

\* \* \* \* \*